3,310,505
PRODUCTION OF THERMOPLASTIC MATERIALS
Harry W. Parker, Bartlesville, Okla., assignor to Phillips
Petroleum Company, a corporation of Delaware
Filed Mar. 11, 1963, Ser. No. 264,294
5 Claims. (Cl. 260—2.5)

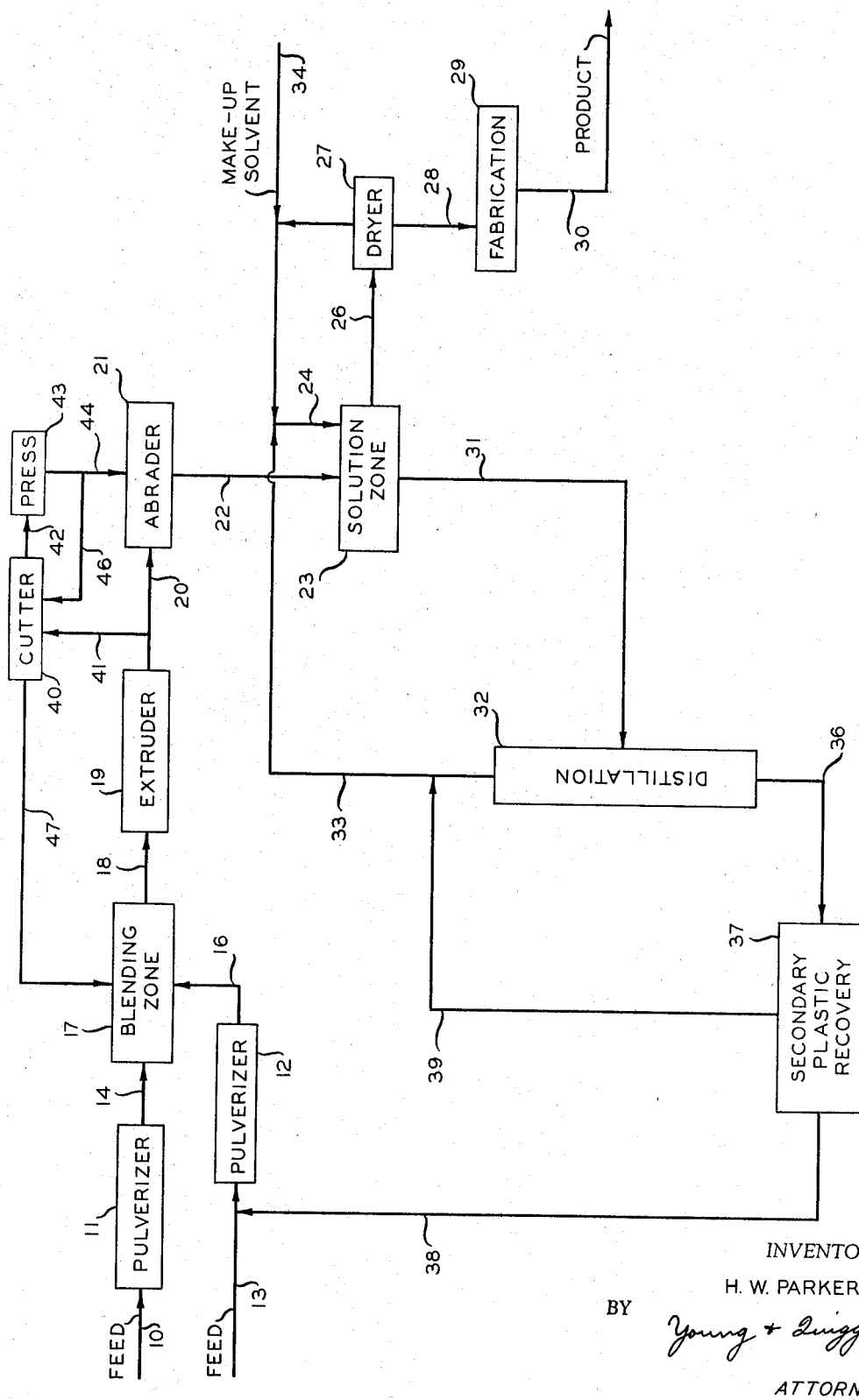

This invention relates to the production of thermoplastic materials.

In recent years, various processes have been developed for the production of polymers of 1-olefins, which polymers have found wide utility in the production of various thermoplastic items. Although thermoplastic materials formed from 1-olefin polymers have found wide utility, the industry is constantly seeking new uses as well as ways of improving on the properties of these thermoplastic materials.

I have by my invention provided thermoplastic materials formed from 1-olefin polymers having increased strength and having a porous structure such that said thermoplastic materials are particularly adaptable as filter materials, garment materials, insulating materials and the like.

Accordingly, an object of my invention is to provide an improved thermoplastic material.

Another object of my invention is to provide a thermoplastic material which is particularly adaptable as a filter material, garment material and insulating material.

Other objects, advantages, and features of my invention will be readily apparent to those skilled in the art from the following description and the appended claims.

In accordance with my invention, a pair of mutually insoluble materials comprising a 1-olefin polymer and a secondary plastic material selected from thermoplastic, resinous and elestomeric polymers are molded into sheets, the surface filament of the molded sheets broken, and the molded sheets treated with a solvent selective to said secondary plastic material.

The 1-olefin polymers employed in the inventive process can be prepared by any known procedure, including visbreaking of the original polymers. The 1-olefin polymers can be prepared from the polymerization of 1-olefins having up to and including 8 carbon atoms per molecule. The polymerization product can be a solid homopolymer or a copolymer, or a mixture thereof. Examples of 1-olefin hydrocarbons which can be employed in the preparation of the 1-olefin polymers are ethylene, propylene, 1-butene, 1-hexene, and 1-octene. Also, 1,1-dialkyl-substituted and 1,2-dialkyl-substituted ethylenes can be employed. Examples of the di- and polyolefins of which the double bonds are in non-conjugated positions and which can be employed in the preparation of the 1-olefin polymers are 1,5-hexadiene, 1,4-pentadiene and 1,4,7-octatriene. Cyclic olefins also can be employed, such as cyclohexene.

The secondary thermoplastic, resinous and elastomeric polymers applicable to the process of this invention include the 1-olefin polymers previously described and which are mutually insoluble with the first polymer and polymers prepared from the polymerization of monomers having from 4 to 12 carbon atoms per molecule and containing an active $CH_2=C<$ group, such as styrene, various alkyl and substituted alkyl styrenes, p-chlorostyrene, p-methoxystyrene, alpha-methyl-styrene; acrylic and substituted acrylic acids and their esters such as acrylic acid, methacrylic acid, methylacrylate, ethylacrylate, methyl methacrylate, ethyl methacrylate, butyl methacrylate; nitriles such as acrylonitrile, methacrylonitrile; amides, such as methyl acryloamide; ketones, such as methyl isopropyl phenol ketone, methyl vinyl ketone; ethers, such as methylvinylether; halides such as vinylchloride, vinylidene chloride. Suitable polymers can include polymerizable heterocyclic nitrogen bases of the pyridine and quinoline series; examples of such compounds are 2-methylvinylpyridine, 2-vinyl-5-ethyl-pyridine, 2-methyl-5-vinylpyridine, 2-vinyl-crinoline, 2-vinyl-4-ethylquinoline, 3-vinyl-6,7-di-n-propyl-quinoline. Suitable polymers also include those groups prepared by polymerizing a conjugated diene, a mixture of conjugated dienes or a mixture comprising a conjugated diene and another copolymerizable monomer containing the active $CH_2=C<$ group.

The pair of mutually insoluble materials comprising a 1-olefin polymer and a secondary plastic material selected from thermoplastic and elastomeric polymers are molded together in the weight ratio in the range of 1:8 to 1:0.5, respectively. Although not to be limited thereto, preferably the 1-olefin polymer and the secondary material have not greatly different viscosities at their melt temperatures and both of said mutually insoluble materials should preferably melt at nearly the same temperature.

The drawing is a schematic representation of one embodiment of the inventive process.

Referring to the drawing, the invention will be described as it is applied to the production of a thermoplastic material from a pair of mutually insoluble materials consisting of polyethylene and polymethylmethacrylate, although there is no intention to limit the invention thereto. Polyethylene particles are passed via conduit means 10 to a conventional pulverizer 11 wherein the polyethylene particles are ground into a powder having a particle diameter size preferably in the range of 200 mesh to ¼ inch. Polymethylmethacrylate particles are passed via conduit means 13 to pulverizer 12 wherein said polymethylmethacrylate particles are ground to provide a powdered polymethylmethacrylate having a particle size preferably in the range of 200 mesh to ¼ inch. The powdered polyethylene is passed via conduit means 14 to blending zone 17. The powdered polymethylmethacrylate is passed via conduit means 16 to blending zone 17. The size of the particles is not critical to the invention as particles larger than ¼ inch and smaller than 200 mesh can also be employed in the blending zone.

Powered polyethylene and powdered polymethylmethacrylate are mixed within blending zone 17 in weight ratios ranging from 1:4 to 1:2.5. The powdered mixture is heated within blending zone 17 to a temperature in the range of 250–350° F. The heated mixture is passed via conduit means 18 to an extruder 19 or other means of subjecting the heated mixture to deforming pressures up to about 800 p.s.i. such as molds, rolls, and other well-known plastic processing means.

By deforming pressure I am referring to the process of applying pressure to the blended mixture such that the mixture is deformed or reshaped and caused to flow. It is within the scope of this invention to eliminate the heating step in those cases where the particle diameter size of the feed materials to the blending zone is less than about 30 mesh.

Preferentially, although not to be limited thereto, the outlet of the extruder 19 is of thin-slot cross section to provide a sheet of plastic material of from 10 mils to ⅛-inch thickness and in which the polyethylene is oriented in the direction of flow. The product from the extruder can be passed by means of a cooling belt 20, or other means of conveying the sheeted plastic material, to abrader 21.

Abrader 21 can comprise a pair of cooperating wire buffing rolls operated so as to scuff the upper and lower surfaces of the sheeted plastic material so as to increase the effectiveness of a subsequent solvent extraction step. The abraded plastic material is passed via conduit means 22, which can be a system of guide rollers, to a solution zone 23. It is within the scope of this invention to eliminate the abrading step when the ratio of the secondary plastic material to the 1-olefin polymer is relatively large.

Within solution zone 23, the abraded plastic material is immersed into 10 to 30 parts of a solvent selective to polymethylmethacrylate. The selective solvent employed must be inert to the first 1-olefin polymer and capable of dissolving the secondary material thereby separating the secondary material from the plastic material passed to the solution zone. It is within the skill of the art to determine a suitable solvent for the particular secondary polymer material used. A suitable solvent for polymethylmethacrylate is acetone. The abraded plastic material is immersed in the solvent for a time sufficient to substantially leach out of the plastic material the polymethylmethacrylate. An immersion time in the range of 4 to 12 hours is normally employed. The selective solvent can be passed to solution zone 23 via conduit means 24.

Solution zone 23 can comprise a column, or tower, with a tortuous path for the plastic material. Preferably, the entering plastic material contacts the heaviest loaded solvent (solvent containing plastic material dissolved therein) whereas the fresh solvent feed contacts the plastic material in the final stage. By contacting the plastic material with the fresh solvent in the final stage, the minimum residue of the secondary material is left in the thermoplastic material product. Maximum solution rate of the secondary material can be effected by recirculation or other agitation means, such as a vibrating belt, ultrasonics and the like, of the selective solvent at each flow level, or stage, within solution zone 23.

Although not to be limited thereto, it is preferable that several stages be employed in dissolving the secondary material from the plastic material passed to solution zone 23. By conducting the solvent solution step in multiple stages, complete removal of the secondary plastic is assured. In addition thereto, contact of the plastic material in the final stage with fresh solvent feed will result in substantially no residual secondary plastic remaining in the thermoplastic product material after the subsequent removal therefrom of residual solvent in a drying step.

Solvent evaporated from the thermoplastic product material removed from a single stage solution zone has dissolved secondary plastic contained therein, and therefore, upon evaporation would leave behind in the thermoplastic product material the said dissolved secondary plastic as a residue.

The thermoplastic product material is withdrawn from solution zone 23 and passed via conduit means 26 to a conventional dryer 27 such as an oven or extruder-dryer. Residual solvent is withdrawn from dryer 27 via conduit means 24 and recycled to solution zone 23. The dried thermoplastic product material is withdrawn from dryer 27 and passed by a conduit means 28, such as a conveyor, to a fabrication means 29 wherein the dried product material can be cut, trimmed, rolled, embossed, packaged, and the like. The finished thermoplastic product material is withdrawn from fabrication means 29 via conduit means 30 and passed to product storage.

Loaded solvent (containing dissolved secondary plastic material) is withdrawn from solution zone 23 and passed via conduit means 31 to a solvent recovery means such as a distillation column 32. Solvent is withdrawn from column 32 via conduit means 33 and recycled via conduit means 24 to solution zone 23. Additional make-up solvent as required is passed to conduit means 24 via conduit means 34. Secondary plastic material is withdrawn from distillation zone 32 and passed via conduit means 36 to a secondary plastic recovery zone 37.

Secondary plastic recovery zone 37 comprises a conventional means of drying the secondary plastic (such as an extruder or a means of vacuum drying the secondary plastic) to remove any residual solvent and a means of cutting up or pelletizing the dried secondary plastic. The secondary plastic in particle form is withdrawn from secondary plastic recovery zone 37 and passed via conduit means 38 to conduit means 13 wherein said secondary plastic is combined with make-up fresh secondary plastic feed, as required, and passed to pulverizer 12. Residual solvent is withdrawn from secondary plastic zone 37 via conduit means 39 and said residual solvent combined with the solvent recycled to solution zone 23 via conduit means 33 and 24.

The thermoplastic product material recovered from the process is a porous, non-woven material comprising a poly-1-olefin. The thermoplastic product material can be subjected to conventional strength-increasing, embossing and heat tacking processes to give special effects. The thermoplastic product material is particularly adaptable as a filter medium, garment material, insulating material and the like.

Referring again to the drawing, a second embodiment of the invention will be described. At least a portion of the plastic material withdrawn from extruder 19 via conduit means 20 can be passed via conduit means 41, such as conveyor belts, to a conventional cutter means 40. Cutter means 40 can comprise, for example, rotating knives to cut or shred the plastic material into particles less than ¼ inch in diameter. The cut or shredded plastic material is withdrawn from cutter means 40 via conduit means 42 and passed to a means 43 of remolding the plastic material into sheets such as rollers capable of applying deforming pressures up to about 800 p.s.i. or an extruder having a thin-slot cross section. By thus cutting up the plastic material recovered from extruder 19 and reforming the plastic sheets, applicant has provided a plastic material in which the polyethylene is non-oriented. The reformed plastic sheeted material can then be passed from pressure means 43 to abrader 21 via conduit means 44, the remainder of the process remaining the same as described in connection with the first embodiment.

It is also within the scope of this invention to recycle at least a portion of the plastic material withdrawn from pressure means 43 to cutter 40 wherein said recycled plastic sheeted material is again cut or shredded and passed to pressure means 43 as previously described. It is also within the scope of this invention to recycle at least a portion of the shredded plastic material from cutter means 40 to blending zone 17 via conduit means 47.

The following examples are presented as illustrative of the invention. It is not intended that the invention should be limited to the specific embodiments illustrated therein.

*Example I*

Eight grams of polymethylmethacrylate and 2 grams of polyethylene were mixed together and molded in a platen press at a temperature of about 350° F. The resulting pressed sheet had a thickness of 0.3 to 0.9 millimeter. This sheet was cut into small segments ranging from ⅛ to ¼ inch on a side. The segments were remolded into a sheet and the entire process of cutting and remolding repeated. The sliced molded sheet was placed in acetone overnight to leach out the polymethylmethacrylate. The thermoplastic sheet was then embossed with a heated No. 24 gauge wire. The product thermoplastic sheet was a high strength porous material suitable as a filter material.

*Example II*

Four grams of polyethylene and 6 grams of polymethylmethacrylate were mixed and molded in a platen press at about 350° F. The resulting pressed sheet had a thickness of 0.3 to 0.9 millimeter. The molded sheet was placed in acetone overnight to leach out the polymethylmethacrylate. The product thermoplastic sheet was a porous material suitable as an insulating material.

As will be evident to those skilled in the art, various modifications of this invention can be made, or followed, in the light of the foregoing disclosure and the appended claims.

I claim:
1. A process for producing thermoplastic material comprising:
   (a) forming a mixture in a blending zone consisting of powdered polyethylene and powdered polymethylmethacrylate;
   (b) heating said mixture to a temperature within the range of about 250–350° F.;
   (c) extruding said heated mixture to form a pressed sheet, said pressed sheet having a thickness of 0.3 to 0.9 mm., in which the polyethylene is oriented in the direction of flow;
   (d) cutting said pressed sheet into segments;
   (e) remolding said segments into a sliced molded sheet so as to provide a plastic sheet in which the polyethylene is nonoriented;
   (f) placing said sheet in a solvent selective to said polymethylmethacrylate to leach out said polymethylmethacrylate.
2. A process according to claim 1 which includes the step of repeating said cutting and remolding of said segments into a sliced, molded sheet.
3. A process according to claim 2 wherein said polyethylene is present in an amount of 1 part by weight polyethylene to 4 parts by weight polymethylmethacrylate.
4. A process according to claim 2 to include the step of embossing said sliced molded sheet with a heated gauge wire.
5. A process according to claim 3 wherein said segments range in size from 1/8 to 1/4 inch on a side.

References Cited by the Examiner
UNITED STATES PATENTS

| | | | |
|---|---|---|---|
| 2,673,825 | 3/1954 | Biefield et al. | 260—2.5 |
| 3,020,597 | 2/1962 | Smith-Johannsen | 260—2.5 |
| 3,228,986 | 1/1966 | Canterino | 260—2.5 |

MURRAY TILLMAN, *Primary Examiner.*

N. F. OBLON, *Assistant Examiner.*